US006986464B2

(12) United States Patent
Takiguchi et al.

(10) Patent No.: US 6,986,464 B2
(45) Date of Patent: Jan. 17, 2006

(54) MAGNETIC INK CHARACTER READING APPARATUS AND MAGNETIC INK CHARACTER READING METHOD

(75) Inventors: Yuji Takiguchi, Nagano-ken (JP); Naohiko Koakutsu, Amstelveen (NL); Yoshiaki Kinoshita, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 35 days.

(21) Appl. No.: 10/771,212

(22) Filed: Feb. 3, 2004

(65) Prior Publication Data

US 2004/0217170 A1 Nov. 4, 2004

(30) Foreign Application Priority Data

Feb. 3, 2003 (JP) ........................... 2003-026148
Nov. 13, 2003 (JP) ........................... 2003-384061

(51) Int. Cl.
*G06K 7/08* (2006.01)

(52) U.S. Cl. ................. 235/449; 235/439; 235/379
(58) Field of Classification Search ................. 235/439, 235/449, 379; 250/559.37; 382/139, 140
See application file for complete search history.

(56) References Cited

U.S. PATENT DOCUMENTS

| | | | | |
|---|---|---|---|---|
| 4,201,978 | A | | 5/1980 | Nally |
| 4,262,589 | A | * | 4/1981 | Gebhardt ...................... 101/45 |
| 4,315,246 | A | | 2/1982 | Milford |
| 4,408,342 | A | * | 10/1983 | Grabowski et al. ......... 382/140 |
| RE31,692 | E | | 10/1984 | Tyburski et al. |
| 5,021,676 | A | * | 6/1991 | Dragon et al. ......... 250/559.37 |
| 5,120,977 | A | * | 6/1992 | Dragon et al. ......... 250/559.37 |
| 5,274,242 | A | * | 12/1993 | Dragon et al. ............. 250/548 |
| 5,352,900 | A | * | 10/1994 | Dragon et al. ......... 250/559.36 |
| 5,631,984 | A | | 5/1997 | Graf et al. |
| 5,754,673 | A | | 5/1998 | Brooks et al. |
| 6,126,072 | A | * | 10/2000 | Martinez et al. ............ 235/439 |
| 6,126,073 | A | * | 10/2000 | Rowlands ................... 235/449 |
| 6,129,273 | A | * | 10/2000 | Shah ........................... 235/380 |
| 6,243,504 | B1 | | 6/2001 | Kruppa |
| 6,259,808 | B1 | * | 7/2001 | Martinez et al. ............ 382/139 |
| 6,469,241 | B1 | * | 10/2002 | Penn .......................... 136/246 |
| 6,644,546 | B2 | * | 11/2003 | George et al. .............. 235/379 |
| 6,669,086 | B2 | * | 12/2003 | Abdi et al. ................. 235/379 |

FOREIGN PATENT DOCUMENTS

| | | |
|---|---|---|
| EP | 0 446 633 | 9/1991 |
| EP | 0 651 345 | 5/1995 |
| JP | 56-147273 | 11/1981 |
| JP | 7-73267 | 3/1995 |
| JP | 7-182448 | 7/1995 |
| JP | 7-200720 | 8/1995 |
| JP | 09-282388 | 10/1997 |
| JP | 2001-022878 | 1/2001 |
| JP | 2001-134702 | 5/2001 |

* cited by examiner

*Primary Examiner*—Daniel Stcyr
*Assistant Examiner*—Daniel A. Hess
(74) *Attorney, Agent, or Firm*—Michael T. Gabrik

(57) ABSTRACT

A character reading system efficiently and quickly applies an optical verification process to detect magnetic ink character misreads. In the system, a magnetic ink character reading device reads magnetic ink characters on a processed medium and generates magnetic ink character data, an image reading device scans an image of the processed medium and generates image data, and a position calculator calculates positions of magnetic ink characters on the processed medium and generates magnetic ink character position information. A communication controller sends the magnetic ink character data, image data, and magnetic ink character position information to a host device which includes an optical recognition device that optically recognizes select magnetic ink characters from the image data based on the character position information. By selectively applying optical verification (e.g., only when character misread by the magnetic reading device is high), verification is required less frequently and high speed processing is enabled.

12 Claims, 13 Drawing Sheets

(b)

0

(c)

1

(d)

2

(e)

3

(f)

4

(g)

5

MAGNETIC INK CHARACTER READING APPARATUS AND MAGNETIC INK CHARACTER READING METHOD

BACKGROUND OF THE INVENTION

1. Field of the Invention

The present invention relates to a character reading apparatus having a magnetic ink character reader (MICR) and optical character reader (OCR), and a character processing method for reading and processing magnetic ink character text printed on a check or other processed medium.

2. Description of the Related Art

Checks are often used for payment in restaurants, when shopping in stores, and for business transactions. Tracking information such as the bank number and checking account number, and the check amount, are printed in standardized magnetic ink characters in a specified area of the check, also called the MICR line, typically on the bottom line of the check. When a check payment is processed, this magnetic ink character information is read and used to query a specific organization, such as the bank or clearing house, for check verification. Reading magnetic ink characters is therefore essential to check payment processing.

Various efforts have therefore been made to assure that the magnetic ink characters are read accurately and to reduce the MICR reject rate. In addition to improving the character recognition technology used by the MICR reader, conventional efforts to improve the read rate have also combined an optical character reader with an MICR reader. Japanese unexamined Patent Appl. Pubs. S49-49545 and H7-182448, for example, teach using optical character recognition (OCR) to read magnetic ink characters that the MICR reader rejected, and thereby improve the overall read rate.

Characters that cannot be read magnetically are, however, unreadable for a reason, and optically reading these characters in order to improve the read rate of the check carries a significant risk of recognition error. The account number and other information printed with magnetic ink is basic to making a payment by check and requires accurate reading. More particularly, misreading the magnetic ink characters results in the subsequent payment process being based on erroneous data, which could create major post-processing problems. If read errors are a possibility, it is safer to simply process the check as unreadable. This means that if read errors are possible, some method of checking for misread characters is desirable. However, using the OCR reader to check all characters for read errors, is time-consuming and therefore a problem.

Another problem is caused by the background pattern often printed on checks. More specifically, reading magnetic ink characters with an OCR reader can take a long time to optically isolate the magnetic ink characters, resulting in processing delays.

OBJECTS OF THE INVENTION

An object of the present invention is therefore to provide a magnetic ink character reading apparatus and reading method capable of high speed magnetic ink character reading with an improved misread rate.

A further object of the invention is to provide a magnetic ink character reading apparatus and reading method that improve character verification accuracy and the speed of a character verification process applied by an optical character recognition reader.

SUMMARY OF THE INVENTION

To achieve this object, the present invention applies the verification process of the OCR only to read data having a high likelihood of being misread according to the read conditions of the data read by the MICR, thereby eliminating unnecessary verification processing, enabling faster reading, and preventing misread magnetic ink characters.

According to a first aspect of the present invention, a character reading system is provided. The system comprises a magnetic ink character reading device configured to read magnetic ink characters on a processed medium and to generate magnetic ink character data; an image reading device configured to scan an image of the processed medium and to generate image data; a position calculator configured to calculate positions of magnetic ink characters on the processed medium and to generate magnetic ink character position information; and a communication controller configured to send the magnetic ink character data, image data, and magnetic ink character position information to a host device. The host device comprises an optical recognition device configured to optically recognize select magnetic ink characters from the image data based on the magnetic ink character position information.

The computing speed of the magnetic ink character reading device is generally significantly slower than the computing speed of the host device. If the OCR process is run by the magnetic ink character reading device, the processor load imposed by the OCR process can therefore greatly slow the overall processing speed, and hence the throughput of the magnetic ink character reading device. However, by sending the magnetic ink character data, image data, and magnetic ink character position information from the magnetic ink character reading device to the host device and having the host device run the OCR process based on the magnetic ink character position information, optical character recognition can be efficiently completed without overloading the magnetic ink character reading device, and verification improving the accuracy of magnetic ink character data detection can also be applied as needed. The magnetic ink character data, image data, and magnetic ink character position information can be sent by the magnetic ink character reading device in response to a command issued by the host.

Preferably, the host device further comprises a comparison unit configured to compare the optically recognized magnetic ink characters with the magnetic ink character data generated by the magnetic reading device to verify the magnetic ink character data.

Thus comprised, verification by the optical recognition device of read characters having little likelihood of being misread is unnecessary. In general, over 90% of the magnetic ink characters can be read by the magnetic ink character reading device at a recognition condition having an extremely low likelihood of error (misread). For characters that were unreadable under any of these highly accurate reading conditions, reading is attempted again using fuzzier recognition conditions. If verification is applied only to the characters read using these fuzzier recognition conditions (about 10% of the characters), then misreads can be substantially avoided, while the verification load imposed by the optical recognition device is kept small, thereby enabling fast and accurate reading of the characters. Moreover, with the position information from the position calculator, the optical character reading device can accurately determine the magnetic ink character positions, eliminate unnecessary image processing, and execute an extremely fast verification process.

In comparing an optically recognized character with the corresponding magnetically read character, the comparison unit may process that character as unreadable when the optical recognition differs from the magnetic reading. On the other hand, a match between the magnetic reading and the optical recognition of a character means that the likelihood of a misread is extremely low and that the particular character can therefore be treated as being read correctly. The invention can also be configured to consider a character as unreadable when the optical recognition device cannot recognize the character.

The magnetic ink character reading device typically stores at least two recognition condition levels with different character reading accuracy requirements and attempts reading the magnetic ink characters using the recognition conditions sequentially from the most accurate to the least accurate condition until magnetic ink character reading succeeds. The optical recognition device then runs a verification process for detecting a misread of any character for which the magnetic ink character reading device read at a recognition condition level having an accuracy level lower than the highest accuracy level.

The recognition condition levels are typically incremental levels to improve the read rate. Which level of recognition condition is used as the threshold to determine whether misread verification is required can be desirably determined by considering the accuracy of the recognition condition levels, the verification process speed, and the required read accuracy.

The system may further comprise a starting position verification unit for optically verifying the magnetic ink character reading start position, and when the reading start position is determined wrong, retries magnetically reading the character.

The system can also be configured to detect a false character starting point caused by stray dots (e.g., magnetic ink mist) or folds in the check, which would otherwise result in misread or unreadable characters. In such cases this version of the invention can verify the correct starting point by means of the optical recognition device, and then retry reading the magnetic ink characters based on the corrected starting point. To this end, the system may include a fold detector for optically verifying presence of a fold through the magnetic ink characters on the processed medium or a stray mark detector for detecting a stray mark on the processed medium; and a correction processor for correcting the reading range of each magnetic ink character in the area of the fold or stray mark, if a such irregularity is detected. When there is a fold through the magnetic ink character area, the magnetic waveform tends to go flat. A fold detector and correction processor compensate for this problem.

Yet further preferably, the character reading system also includes a printing device for printing on the processed medium. By thus providing a printer, the invention provides a system that can be implemented with a single device deployed in a POS terminal, for example, to read magnetic ink characters when processing check payments while also printing information on the front and back of the check.

Thus comprised, the host device runs the OCR process instead of the magnetic ink character reading device, enabling verification that improves the accuracy of magnetic ink character data detection.

In another aspect, the character reading system comprises a transportation path adapted to convey a sheet-type processed medium having magnetic ink characters recorded thereon; a magnetic reading device configured to acquire magnetic data corresponding to magnetic ink characters using a magnetic head disposed along the transportation path, and configured to read magnetic ink characters from the magnetic data; a position calculator configured to generate position data identifying positions of magnetic ink characters on the processed medium based on the magnetic data from the magnetic reading device; and an optical character reading device configured to identify the positions of magnetic ink characters to be read based on the position data, and to optically read select magnetic ink characters.

Thus comprised, optical processing can be limited to just the required area because the location of the magnetic ink characters can be accurately identified. The optical recognition device can therefore complete verification quickly, and misread verification can be applied to all characters read by the magnetic reading device.

Another aspect of the invention involves a character reading method for reading magnetic ink characters printed on a processed medium. The method comprises reading the magnetic ink characters using a magnetic reading device; calculating, using the magnetic ink character reading device, positions of the magnetic ink characters on the processed medium and generating position information; and identifying magnetic ink character positions based on the position information and reading the magnetic ink characters using an optical reading device.

Still another aspect of the invention involves a character reading method for a character reading system comprised of a magnetic ink character reading device for reading magnetic ink characters on a processed medium, and a host device for controlling the magnetic ink character reading device. The character reading method comprises the steps of reading magnetic ink characters on the processed medium and generating magnetic ink character data using the magnetic ink character reading device; scanning the processed medium and generating image data using the magnetic ink character reading device; calculating positions of magnetic ink characters on the processed medium and generating magnetic ink character position information using the magnetic ink character reading device; sending the magnetic ink character data, image data, and magnetic ink character position information to the host device; and optically recognizing select magnetic ink characters from the image data based on the magnetic ink character position information.

Preferably, the host device performs the step of comparing the optically recognized magnetic ink characters and the magnetic ink character data generated by the magnetic reading device to verify the magnetic ink character data.

The method may also be able to handle folds and stray marks. To that end, the method may further include detecting any folds and/or stray marks in the processed medium; and applying a correction process, if such irregularity is detected, and repeating the magnetic ink character reading step.

In a preferred embodiment, the character reading method is implemented with a character reading system comprised of a magnetic ink character reading device for reading magnetic ink characters on a processed medium, and a host device for controlling the magnetic ink character reading device. In this case, certain operations are performed by the magnetic ink character reading device and other operations are performed by the host.

The following steps are performed using the magnetic ink character reading device: reading each of the magnetic ink characters at one of a plurality of recognition condition levels or, if any character cannot be read at any of the recognition condition levels, declaring that character as unreadable; scanning the processed medium and generating image data; calculating the position of each of the magnetic ink characters on the processed medium relative to a known position on the processed medium and to generate corresponding magnetic ink character position information; and sending the magnetic ink character data, image data, and magnetic ink character position information to the host device.

Then, the host device optically recognizes, from the image data and the magnetic ink character position information, each magnetic ink character for which it was determined that verification is required. In so doing, the host device preferably compares each optically recognized magnetic ink character with the corresponding magnetically read character to verify the magnetic ink character data.

Preferably, the host device also compares each optically recognized magnetic ink character with the corresponding magnetically read character to verify the magnetic ink character data.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

Embodiment 1

Figure 1:
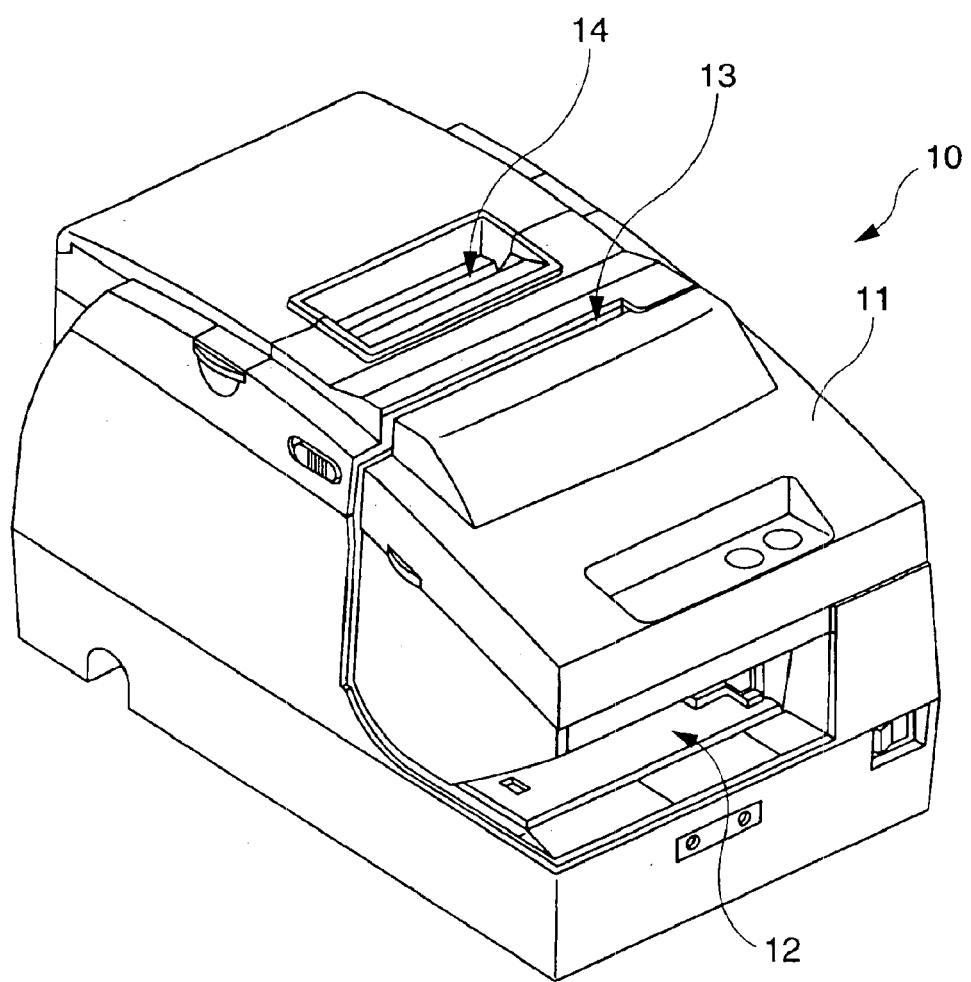
FIG. 1 is an oblique overview of a hybrid processing apparatus having a magnetic ink character reader.

FIG. 1 is an oblique overview of a hybrid device 10 having an MICR reader according to a first embodiment of the present invention. When a check payment is processed, check validity is verified, the front of the check is filled out including the amount, the check is signed by the payer, and the check is endorsed. By having a printer in addition to the MICR reader and OCR reader, a single hybrid device 10 can complete the entire check processing operation, including magnetic ink character reading and printing on the front and back sides of the check information required to complete payment by check.

It should be noted that, while the invention is described using a check as the most typical example of media processed by the invention, the invention is not so limited. Rather, the present apparatus and method for reading and processing MICR text and can be used for processing other financial instruments as well.

Furthermore, not all applications of the invention require a printer, but because the invention is described below using check payment processing as the most typical example of its application, the invention is described with reference to a hybrid device 10 having an MICR function, a OCR function, and a printing function.

This hybrid device 10 is covered by a plastic cover 11. An insertion opening 12 for manually inserting checks (processed media) is formed at the front of the hybrid device 10. A check inserted into this insertion opening 12 is later ejected from an exit opening 13 formed in the top. The hybrid device 10 also has a roll paper compartment (not shown in the figure) for storing roll paper in the back, and the roll paper so stored is conveyed through the printing unit and discharged from the roll paper exit 14 formed in the top of the case.

Figure 2:
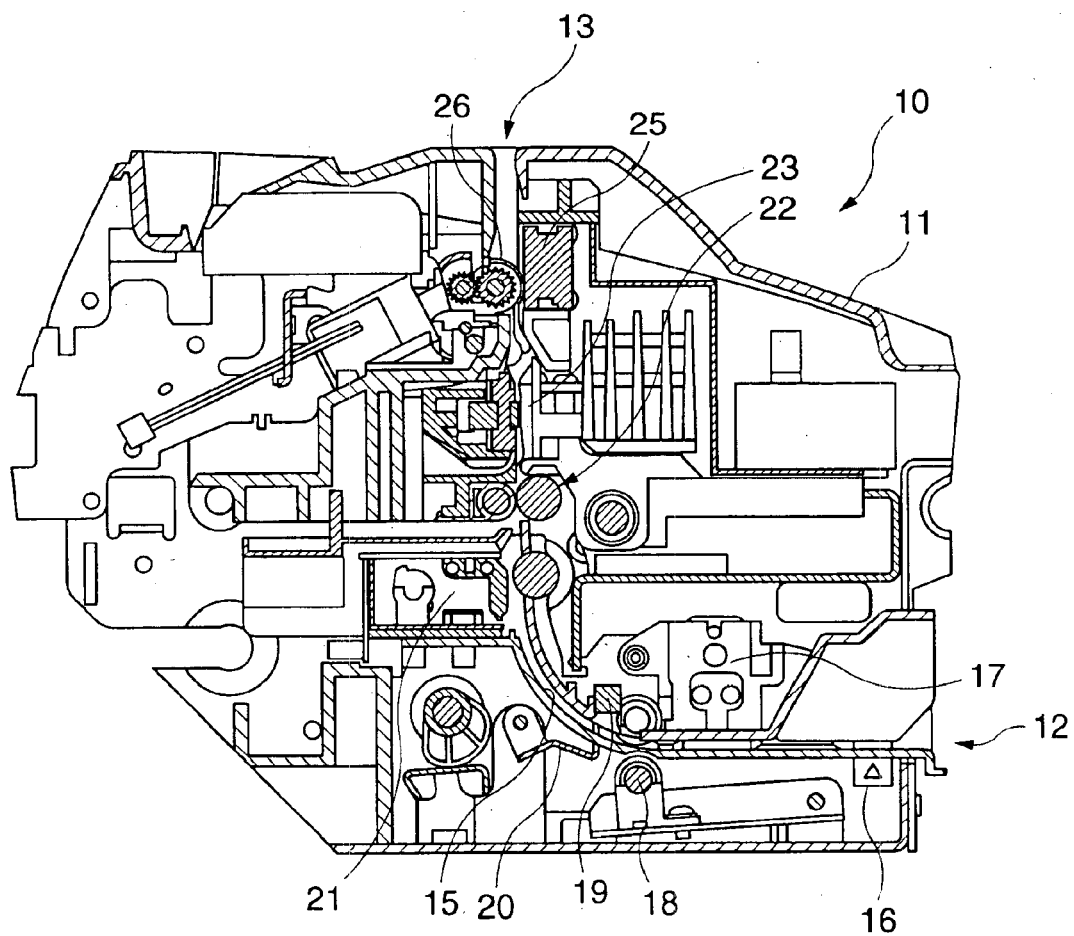
FIG. 2 is a side section view of the internal structure of a hybrid processing apparatus having a magnetic ink character reader.

FIG. 2 is a side section view showing the internal structure of the hybrid device 10. As shown in this figure, the hybrid device 10 has an internal check transportation path 15 that extends generally horizontally from the insertion opening 12, then curves upward and extends generally vertically to the exit opening 13. The transportation path 15 thus forms an L-shaped curve when seen from the side.

Disposed along the transportation path 15 in order from the insertion opening 12 side are a form trailing edge detector 16, MICR head 17, first transportation roller pair 18, leading edge detector 19, form positioning member 20, back print head 21, second transportation roller pair 22, front print head 23, and either a charge-coupled device (CCD) or contact image sensor (CIS) scanner 25. A feed roller 26 is also disposed opposite the CCD or CIS 25.

The trailing edge detector 16, leading edge detector 19, and form discharge detector (not shown in the figure) are transmissive or reflective photo detectors for contactlessly detecting the presence of a check or other medium at various positions along the transportation path 15.

The form positioning member 20 is adapted to pivot between an open position in which member 20 is retracted from the transportation path 15 and a closed position in which member 20 extends into the transportation path to temporarily stop the transport of an inserted check at a specified position. The movement of form positioning member 20 is selectively controlled by a solenoid or other actuator.

The first transportation roller pair 18 and second transportation roller pair 22 each have a pair of rollers on opposite sides of the transportation path 15. One roller in each pair is a drive roller for conveying the check in either a forward or a reverse direction. Furthermore, one roller of each pair is movably disposed relative to the other roller. A solenoid or other actuator can be driven to open and close the transportation path 15 by opening the rollers to release the processed medium or closing the rollers to transport the medium.

Figure 3:
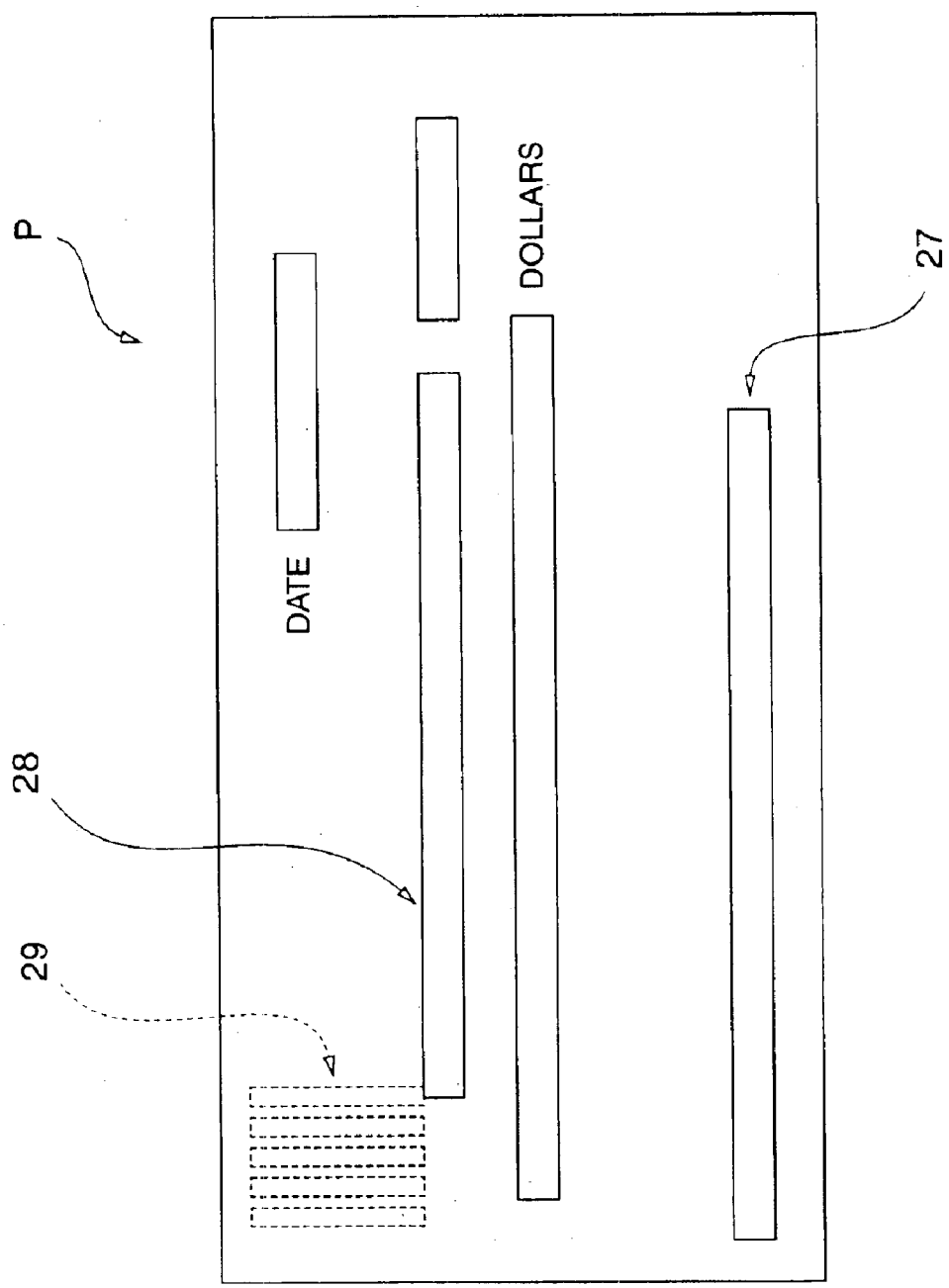
FIG. 3 is a schematic diagram showing a typical check layout.

The MICR head 17 reads magnetic ink characters recorded on the check face, and each check is determined valid or invalid based on the data read by the MICR head 17. As shown in FIG. 3, the magnetic ink characters are recorded in a specified MICR area 27 on the front of the check P. The magnetic ink character data includes the account number of the check and other information. A pressure member (not shown in FIG. 2) for pressing the check P to the MICR head 17 for the reading operation is disposed opposite the MICR head 17. The magnetic data acquired by the MICR head 17 is output to a MICR processor, which processes and recognizes the magnetic ink characters. If MICR reading is not needed, the pressure member is retracted from the MICR head 17 and the transportation path 15 opened.

The front print head 23 is for printing the payee, date, and amount information to the front of the check P in the check printing area 28 shown in FIG. 3. The front print head 23 is a serial dot matrix print head mounted on a carriage, and prints one or multiple lines while traveling widthwise with respect to the check P. In this preferred embodiment of the invention, the front print head 23 is a dot impact print head that transfers ink from a ribbon to the check P, but the invention is not so limited; other types of print heads can be used.

The back print head 21 prints an endorsement on the back of the check P including the customer verification number, date, check amount, and other information required by the store in an endorsement printing area 29 such as shown in FIG. 3. This back print head 21 is dot matrix shuttle type print head having a plurality of heads disposed at a specific interval widthwise with respect to the check P for printing one or multiple lines by moving the heads within the space of this interval. A dot impact print head that transfers ink from a ribbon to the check P is used as the back print head 21 in the present embodiment, but the invention is not so limited; an ink-jet or other type of print head can be used.

The CCD or CIS 25 optically reads the magnetic ink characters on the printed check P when an OCR request is asserted. This OCR request is output when specific conditions, defined below, are met. The check P is conveyed by the feed roller 26 in front of the CCD or CIS 25 and then ejected from the exit opening 13. The magnetic ink character part of the optical data acquired by the CCD or CIS 25 is then analyzed by the OCR processor to optically recognize the magnetic ink characters.

Figure 4:
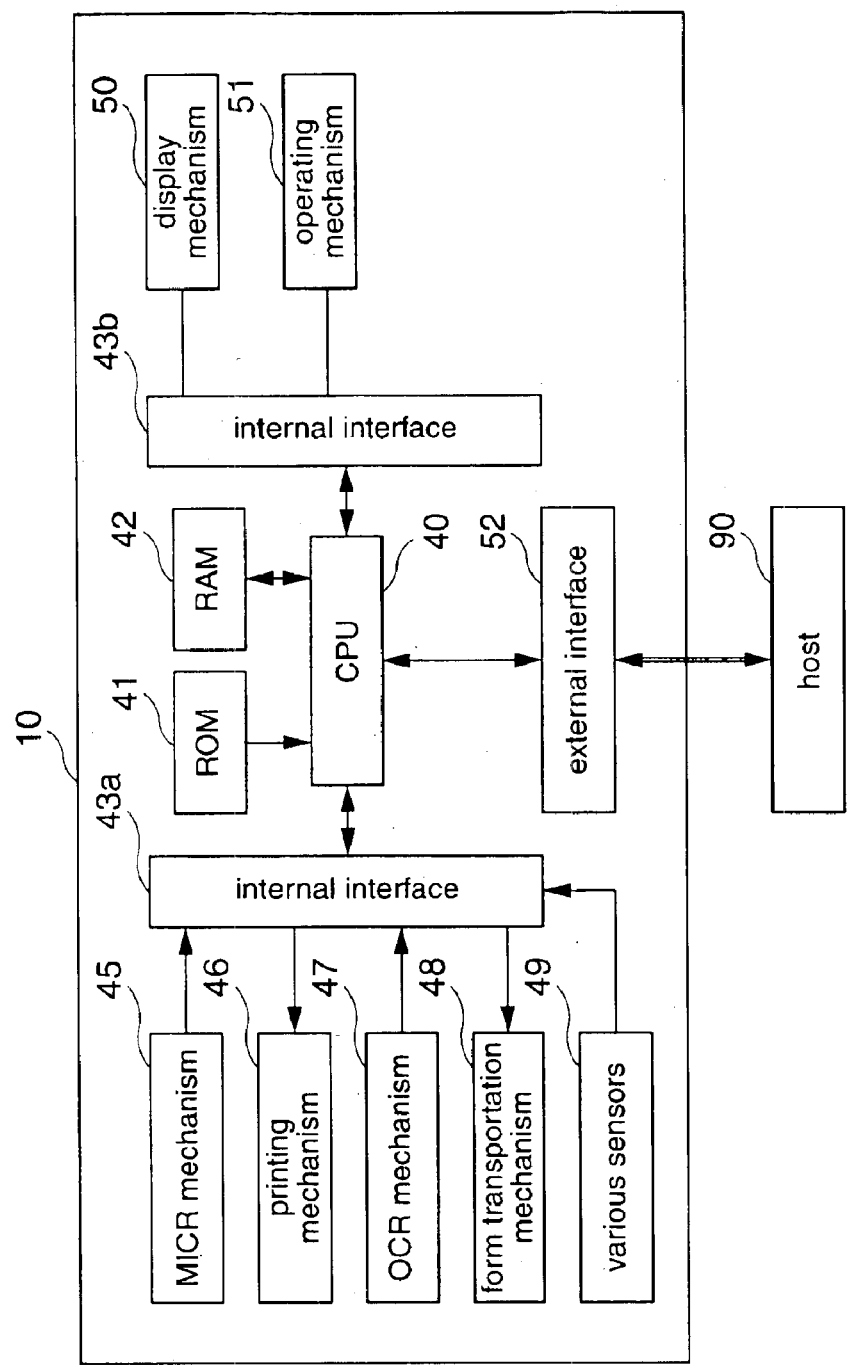
FIG. 4 is a schematic block diagram showing a hardware configuration of a hybrid device having a magnetic ink character reader.

FIG. 4 is a block diagram showing the major hardware components of this hybrid device 10. Operation of the hybrid device 10 is controlled by a CPU 40, ROM 41, RAM 42, or other memory, and software (not shown in the figure) stored in memory. Connected to the CPU 40 through internal interfaces 43a, 43b are a MICR mechanism 45, printing mechanism 46, OCR mechanism 47, form transportation mechanism 48, various sensors 49, display mechanism 50, and operating mechanism 51. The CPU 40 controls these other parts based on a control program stored in memory. Each mechanism contains logic circuits required to perform its function. The hybrid device 10 is also connected through external interface 52 to a POS terminal or other host device 90, and performs specific operations as controlled by the host 90.

(Basic Processing Sequence)

Figure 5:
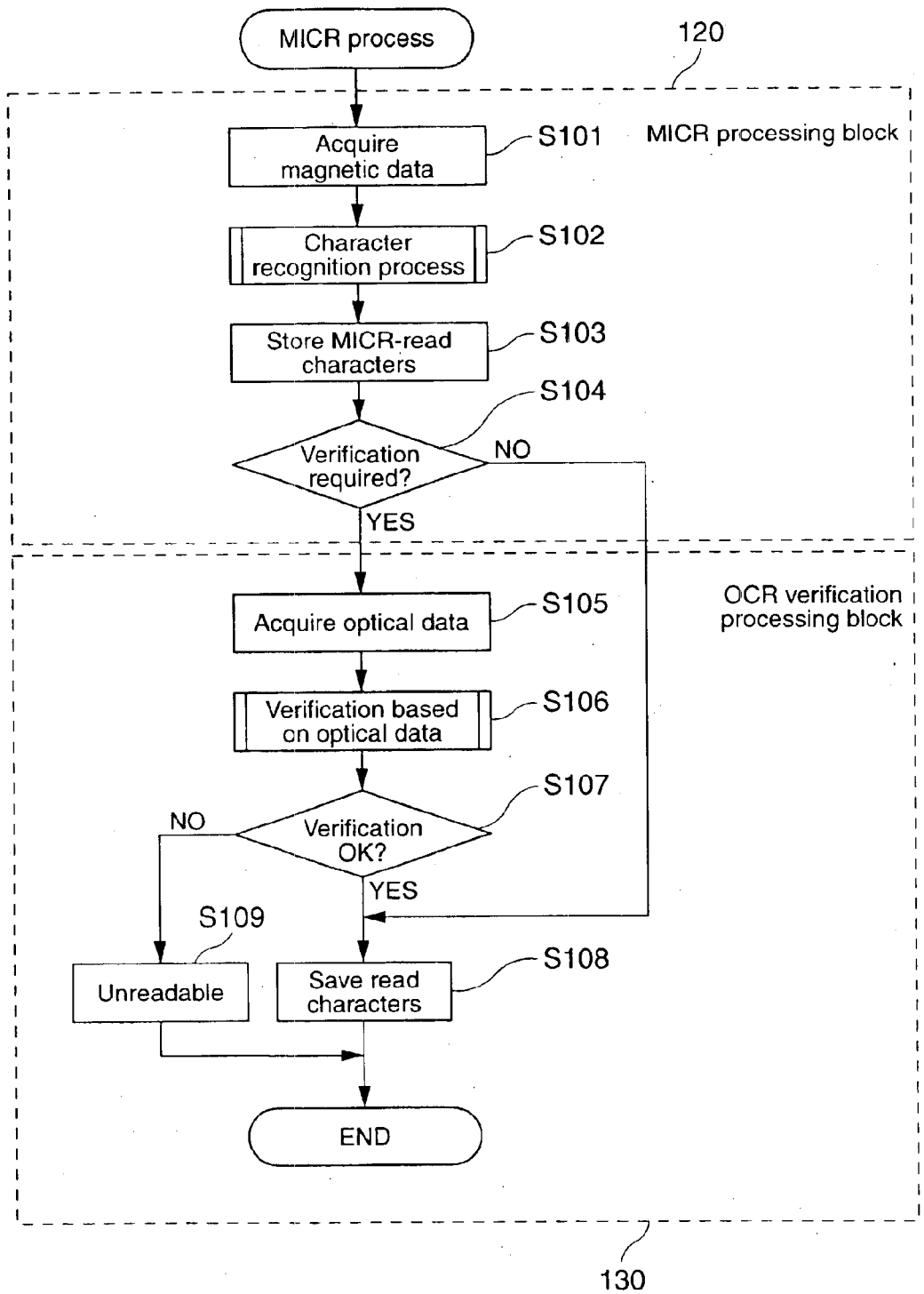
FIG. 5 is a flow chart of a magnetic ink character reading process according to a preferred embodiment of the present invention.

FIG. 5 is a flow chart of the magnetic ink character reading process according to a preferred embodiment of the invention. This reading process has an MICR processing block 120 and an OCR verification processing block 130 denoted by dotted lines in FIG. 5.

In the first step of this process magnetic data is acquired by means of the MICR head 17 (S101) and then a character recognition process is applied to this data (S102). The recognized magnetic ink characters are stored (S103), and whether verification of recognition errors is necessary is determined according to the character recognition conditions and status (S104). If verification is not needed (S104: no), the recognized characters are confirmed as the correct characters and the characters stored (S108). The magnetic ink character reading process then ends.

If verification is needed (S104: yes), the magnetic ink character area is read optically by the CCD or CIS 25 (S105). Based on the acquired optical data, the characters recognized in the MICR processing block 120 (the MICR characters) are examined for misread errors (S106). The magnetic ink characters are optically recognized based on the optical, e.g., OCR data, and the characters recognized by OCR processing are compared with the characters recognized by MICR processing. If the characters match, it is concluded that there were no misread errors.

If the absence of misread errors is verified (S107: yes), the MICR text is confirmed as the correctly read characters and the characters are stored (S108). The process then ends.

If a character mismatch is verified (S107: no), a misread may have occurred, in which case the check is determined to be unreadable by MICR processing (S109), and the read process ends.

(Description Based on Functional Block Diagram)

Figure 6:
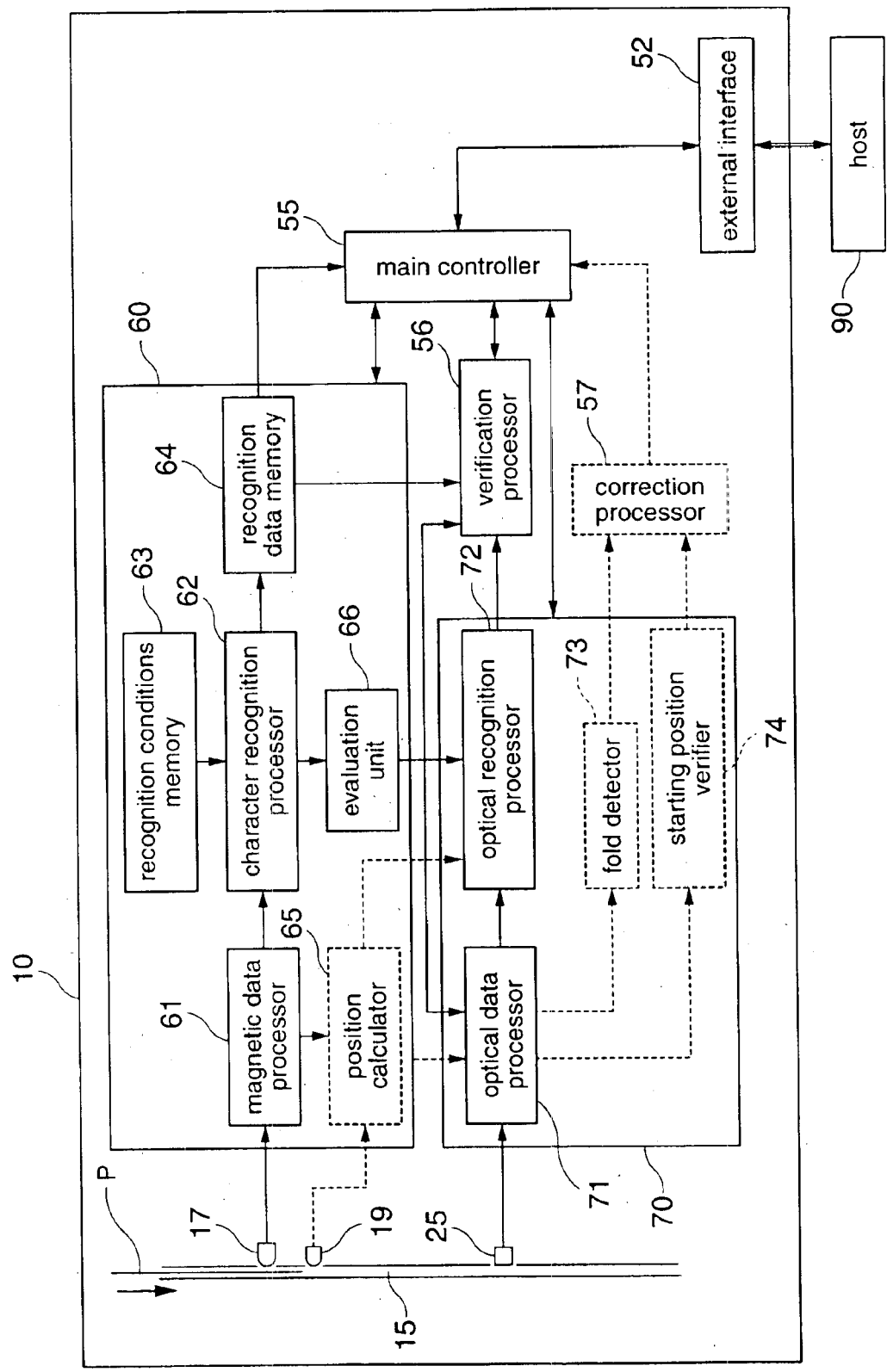
FIG. 6 is a functional block diagram of an MICR unit and OCR unit according to a preferred embodiment the present invention.
Figure 7:
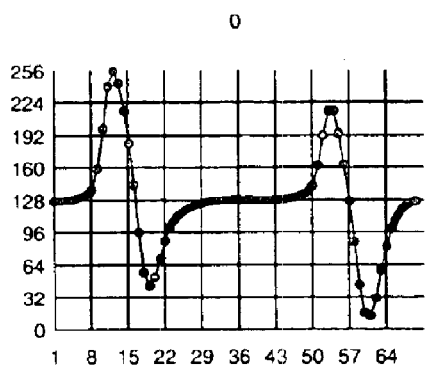
FIGS. 7(a)–(g) shows the magnetic characters 0 to 5 and their corresponding output waveforms in the E-13B font.
Figure 7:
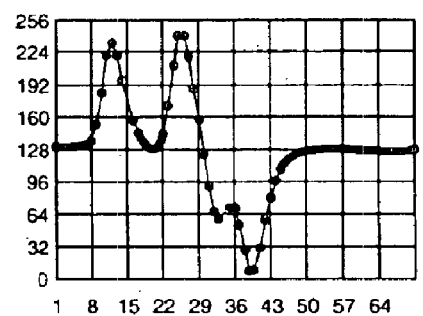
Figure 7:
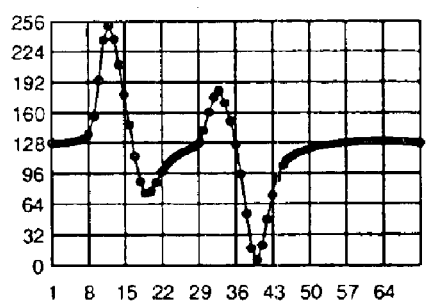
Figure 7:
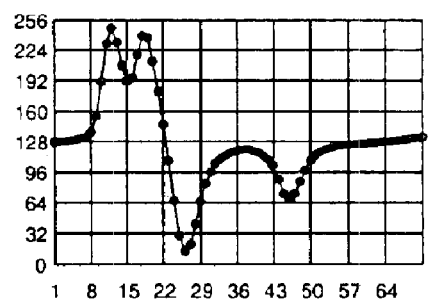
Figure 7:
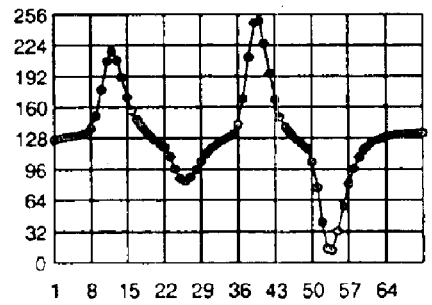
Figure 7:
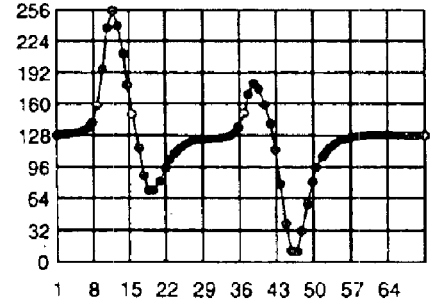

FIG. 6 is a functional block diagram showing the configuration of the MICR and OCR processing portions embodied in hybrid device 10 and the host 90, in accordance with a preferred embodiment of the present invention. As shown in FIG. 6, hybrid device 10 comprises a magnetic reader 60, optical reader 70, verification processor 56, and a main controller 55 for controlling these other parts. For simplicity, only the MICR head 17 and CCD or CIS 25 are shown disposed in the transportation path 15 in FIG. 6.

The MICR head 17 is composed of a permanent magnet and a magnetic head (not shown in the figure). Magnetic ink contains magnetic powder. The magnetic ink characters are therefore magnetized when the check P passes over the permanent magnet. When the magnetized magnetic ink characters then pass in front of the magnetic head, the flux strength varies according to the shape of each magnetic ink character, and a wave determined by the shape of the character is output from the magnetic reading head. The shape of the magnetic ink characters is determined by an established standard, and the specific magnetic ink characters can therefore be read from the waveform patterns. Examples of MICR fonts are E-13B and CMC7.

The E-13B font, for example, defines the numbers 0 to 9 and four special symbols. FIGS. 7(a)–(g) show the numbers 0 to 5 as standardized by the E-13B font and the corresponding output waveforms. The y-axis in FIG. 7(b)–(g) denotes the output voltage (where 128=0 V), and the x-axis denotes time. As will be understood from FIG. 7(d) and FIG. 7(g), the output waveforms for numbers 2 and 5 are quite similar in shape but certain corresponding points occur at different locations on the x-axis (time axis). Thus, these numbers can be easily misread by MICR if the read wave varies for some reason along the time axis. The shapes of the 2 and 5, however, are optically (visually) significantly different, are therefore easily optically recognized, and optical verification is therefore particularly effective.

Magnetic data acquired by the MICR head 17 is first sent to a magnetic data processor 61. The magnetic data processor 61 applies A/D conversion, magnetic ink character extraction, smoothing, and normalization processes. The normalized read data is then compared with reference data by a character recognition processor 62, and recognized as the character corresponding to the matching reference data if the similarity therebetween is within a specified range.

The conditions for character recognition are acquired from recognition conditions memory 63. Several levels of recognition conditions are stored in recognition conditions memory 63 so that there is a range of recognition conditions from very strict to fuzzy (tolerant). The magnetic ink character recognition process starts the character recognition process using the strictest (highest) recognition conditions. If character recognition fails using those conditions, the process is repeated using the next sequentially lower recognition conditions. This process continues until either character recognition succeeds or the lowest recognition conditions are tried. The recognition conditions are described further below.

An evaluation unit 66 then determines whether verification is needed based on the reading conditions under which by the character recognition processor 62 was able to recognize the magnetic ink characters. If verification is required, a verification request is output to the optical reader 70. The verification conditions used by the evaluation unit 66 to determine whether verification is needed are predefined. These verification conditions can be set as desired or required under the circumstances. If character recognition succeeded using high level (strict) character recognition conditions, the likelihood of misreads is low and there is little need for misread verification. More particularly, if character recognition succeeded using the highest recognition conditions, verification is unnecessary.

If a verification request is output by the evaluation unit 66, the magnetic ink characters are optically read by the optical data processor 71 and optical recognition processor 72 of the optical reader 70. The optically read characters are then compared by the verification processor 56 with the magnetically read characters stored in recognition data memory 64. If both recognized characters match, the magnetic ink characters are determined to have been correctly read, and the recognized characters stored in the recognition data memory 64 are output as the magnetically recognized characters to the main controller 55.

The main controller 55 sends the received magnetically read characters through external interface 52 to the host 90. The magnetically read characters can be sent in character units, or all magnetic ink characters for the check could be sent at the same time.

If the verification processor 56 determines that both magnetically and optically recognized characters do not match, the magnetic reader 60 or optical reader 70 may have misread the characters. Misreads complicate subsequent check payment processing, and are therefore preferably avoided. The verification processor 56 therefore tells the main controller 55 to handle those characters as unreadable characters. The main controller 55 then notifies the host 90 that those characters are unreadable.

The host 90 presents the unreadable characters on a display (not shown in the figure) and prompts the user for input. The magnetic ink characters are written in a human-readable form, and the operator can therefore recognize those magnetic ink characters on the check that the machine could not read. Check payment processing can then proceed after the operator enters the recognized characters using a keyboard or other input device.

(Recognition Process Run by the Magnetic Ink Character Reader)

Figure 8:
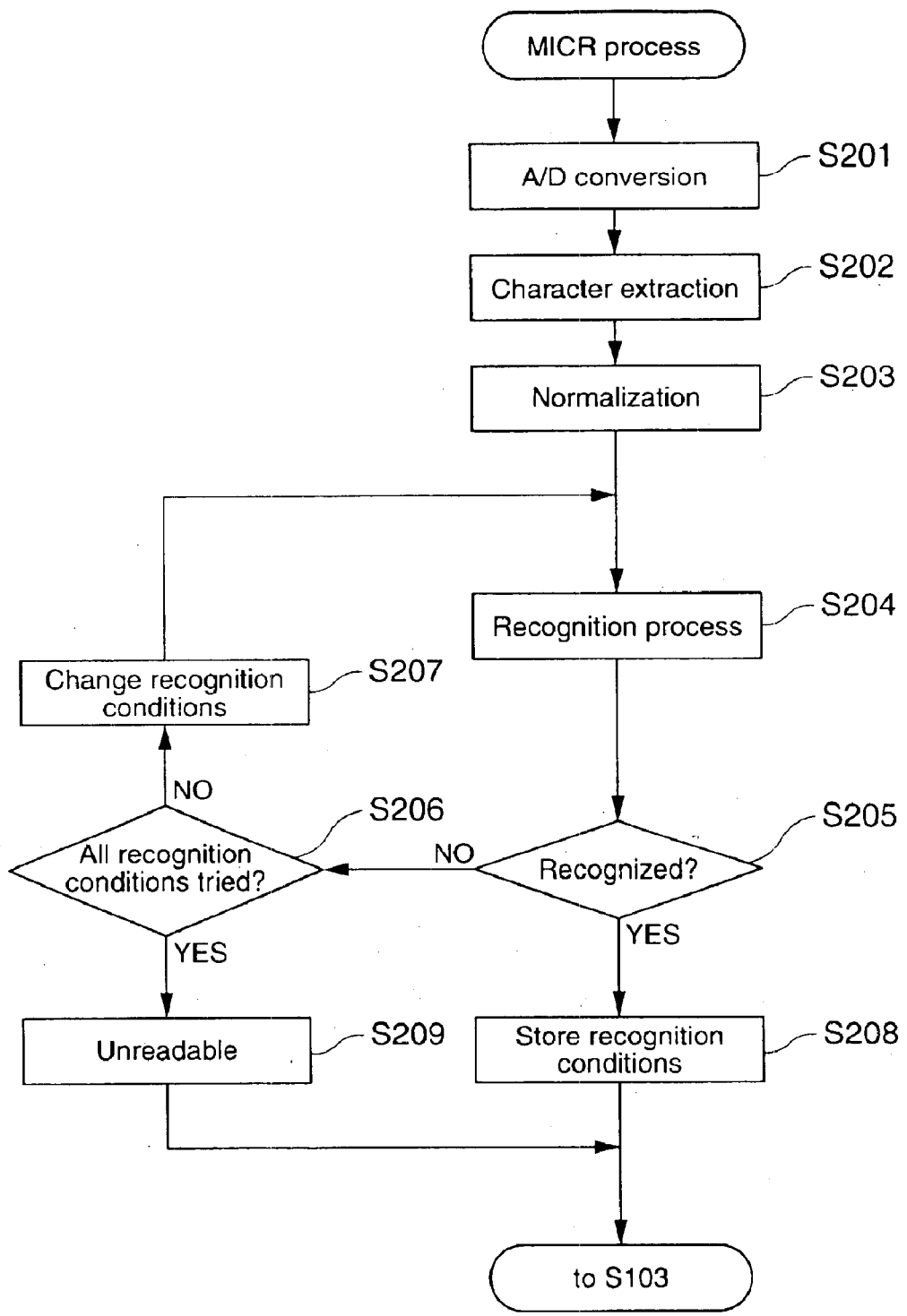
FIG. 8 is a flow chart showing a preferred embodiment of a character recognition process based on magnetic data.

The character recognition process run by the MICR reader is described next with reference to FIG. 8, which is a flow chart of such process based on magnetic ink data executed in step S102 in FIG. 5.

This process starts by converting the magnetic data acquired by the MICR head 17 from analog data to digital data (S201). The magnetic ink characters are then extracted from the sampling signal obtained by converting the magnetic read data to digital data (S202). The character extraction range is determined by, for example, detecting the character starting position.

More specifically, the end of the sampling signal is the data at the right end of the check P. The first peak in the sampling signal is detected in order to find the character starting position. The character starting position is then determined based on the position of the first detected peak, and data in a specified range is extracted as the data for one character. Depending on the type of character, it may not be possible to accurately extract the character starting position. The extracted data can therefore include data before and after the normal range of a single character, and this extra data can later be corrected.

Character extraction is described more specifically below. First, the sampling signal is scanned for data exceeding a specific threshold value. If a sampling point exceeding this threshold value is found, peaks are detected based on this sampling point. When a peak is found, the character starting position is determined referenced to this peak. Sampling values within a specific distance of this character starting position are then extracted as the data for one character.

When character extraction ends, the extracted characters are normalized (S203). E-13B font recognition is based on matching reference character waveform data with the input waveform data. However, the amplitude of the sampling data can vary even for the same character depending on the magnetic ink magnetization level, head pressure, and other factors. It is therefore necessary to adjust the amplitude level of the reference waveform data and the amplitude level of the input waveform data to the same level before confirming waveform matches. This process is called normalization and is described briefly below.

First, the maximum positive and maximum negative values in the data extracted for one character are found. Positive values are normalized to the peak positive value, and negative values are normalized to the peak negative value. The normalization process treats these maximum values as 100%.

When normalization ends the recognition process is run using the first-level recognition conditions, that is, the most stringent recognition conditions, based on the normalized data (S204). If character recognition succeeds using the first-level recognition conditions (S205: yes), the recognition conditions used for character recognition are stored (S208) and control continues to step S103 in FIG. 5.

If character recognition fails (S205: no), step S206 determines if the character recognition process has been tried using all available character recognition conditions. If not (S206: no), the character recognition conditions are changed to the next less stringent level (S207) and the character recognition process repeats (S204). The character recognition conditions are thus changed and the character recognition process repeated until character recognition succeeds or character recognition has been tried using all character recognition conditions (S204–S207 loop). If character recognition fails using all character recognition conditions (S206: yes), the characters are deemed unrecognizable (S209) and operation continues to step S103 in FIG. 5. If character recognition succeeds at some level (S205: eventually yes), the recognition conditions used for character recognition are stored (S208) and control continues to step S103 in FIG. 5.

The character recognition conditions are described in further detail below. If the levels of recognition conditions are expressed as phases, multiple phase levels can be set. Setting too many phase levels, however, is a problem because the character recognition process could then take too long. Setting the recognition conditions in each phase is described below assuming that the recognition conditions are set in four levels from the highest (strictest) phase 1 to the lowest (fuzziest) phase 4.

In phase 1, the reference character waveform data is simply compared with the input waveform data, or is shifted on the time axis for comparison. In phase 2 the character interval is compressed or stretched in one or both directions along the time axis for comparison. In phase 3, a simple direct comparison or comparison shifting on the time axis is made using a reference waveform with less strict recognition conditions than used in phase 1. In phase 4, a simple comparison is done using only the peak positions. Whether using a simple comparison or sliding comparison, the phase can be made less precise (i.e., can be made fuzzier) by gradually varying the range of allowable error.

Normally, if character recognition succeeds using the phase 1 conditions, there is an extremely low likelihood of misread errors, and the need for misread verification is extremely low. Furthermore, because character recognition succeeds at the phase 1 level with 95% of magnetic ink characters, the overall processing load imposed by verification is small even if a small percentage of characters require that verification by the OCR reader be applied at all levels. This means that simply eliminating verification by the OCR reader for characters recognized at phase 1 enables extremely efficient misread verification with a low possibility of misreads.

Further, lowering the character recognition level needed to trigger misread verification can further reduce the verification load. The level used to trigger verification is preferably determined so as to balance the recognition conditions, likelihood of misreads, and the speed of the verification process. More specifically, the verification level is preferably set so as to maintain acceptable reading speed and appropriately avoid misreads with consideration for the possibility of misreads due to the recognition conditions.

(Verification Process Run by the OCR Reader)

Figure 9:
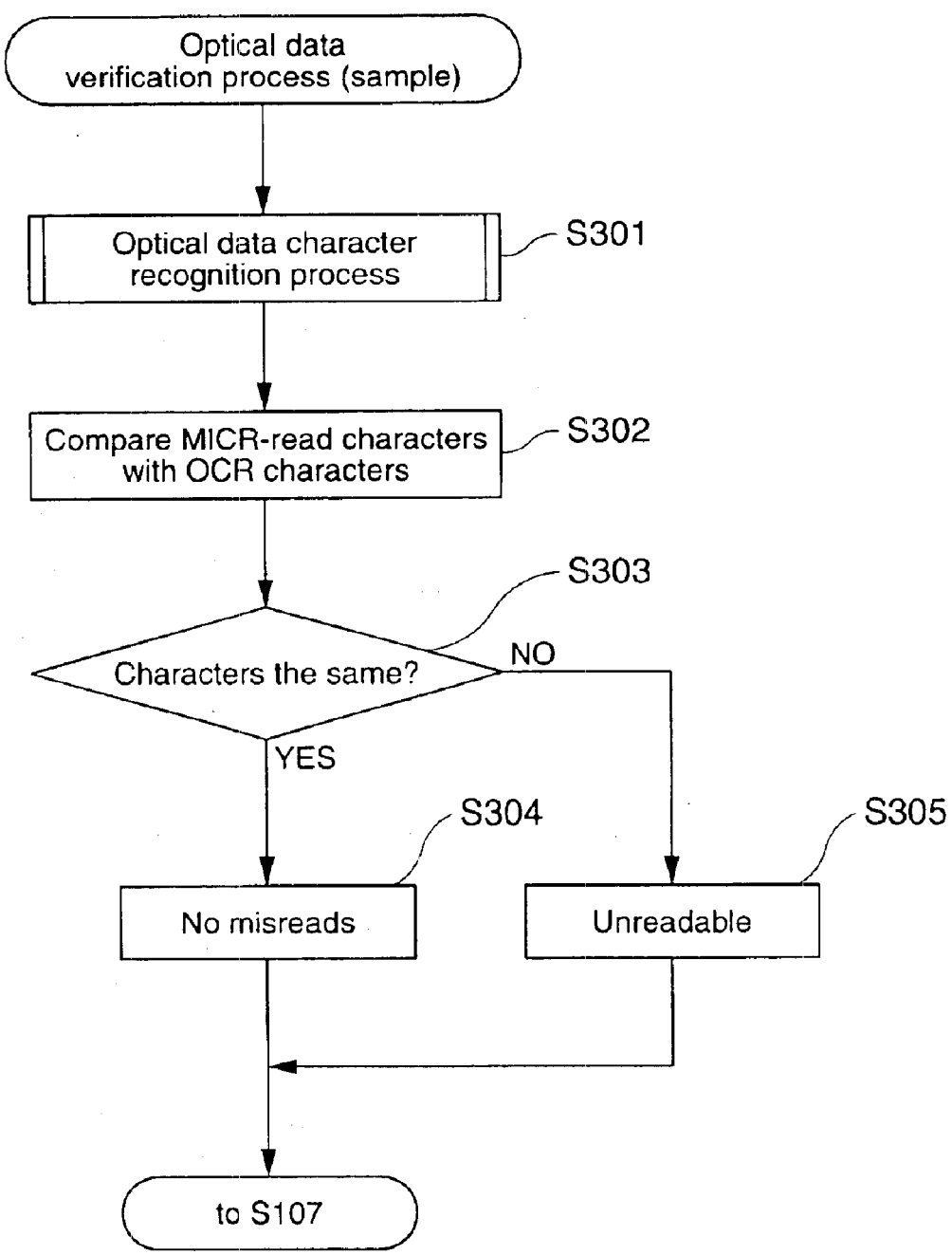
FIG. 9 is a flow chart of a misread verification process in the optical character reading process.

The verification process run by the OCR reader is described next with reference to FIG. 9, which is a flow chart of an exemplary misread verification process run by the OCR process of this invention. The most common process based on optical processing is to apply character recognition based on optical data acquired by the CCD or CIS 25, and compare the optically recognized characters with the corresponding magnetically recognized characters. FIG. 9 shows an example of this process.

An optical character recognition process based on the acquired optical data is first run (S301). For example, reference bitmap patterns are stored for each character, and characters selected for optical recognition are recognized by comparing these reference bitmap patterns with the read data.

Each character recognized by optical processing is then compared with the corresponding magnetically read character (S302). If both match (S303: yes), that character is processed as being correct (i.e., no misread) (S304). For a given character, if the optical recognition does not match the magnetic reading (S303: no), at least one of the results is incorrect; that character is therefore processed as being unreadable (S305). Additionally, if OCR fails for a particular character, that character can be processed as unreadable.

When the OCR and verification processes end, control continues to step S107 in FIG. 5.

Second Embodiment

A second embodiment of the present invention that accelerates the process of the optical character recognition step S301 shown in FIG. 9 is described next. The OCR process must remove background images and characters and symbols other than those of the magnetic ink characters and extract only the magnetic ink part. Removing the background is extremely processor-intensive, and consumes approximately 80% of total OCR processing time. By shortening the processing time consumed in removing the background and other information, it is therefore possible to execute the optical verification process more rapidly.

This second embodiment of the invention identifies the physical printing position of the magnetic ink characters based on the magnetic read data, and sends this position information to the OCR reader. The OCR reader can therefore identify the image of the magnetic ink text and run the image process in an extremely short time because the image processing area can be limited to a narrow range, resulting in high speed character recognition.

The configuration of this second embodiment differs from the first embodiment shown in FIG. 6 in the addition of a position calculator 65 indicated with a dotted line in FIG. 6. The position calculator 65 calculates and stores the position of each magnetic ink character from the leading edge of the check P. The position calculator 65 knows the position of the leading edge of the check P from the output signal of the leading edge detector 19 and acquires the magnetic ink starting position from the magnetic data processor 61. In addition, the distance from the MICR head 17 to the leading edge detector 19, and the feed rate (speed) of the check P are also known. This information therefore enables calculating the physical distance from the leading edge of the check P to the starting position of each magnetic ink character.

The calculated magnetic ink character positions are then sent to the optical data processor 71. If the position on the check of the magnetic ink characters is known, the optical data processor 71 can limit the background removal to just the area of the magnetic ink characters. Less data is therefore processed and high speed processing is possible.

Figure 10:
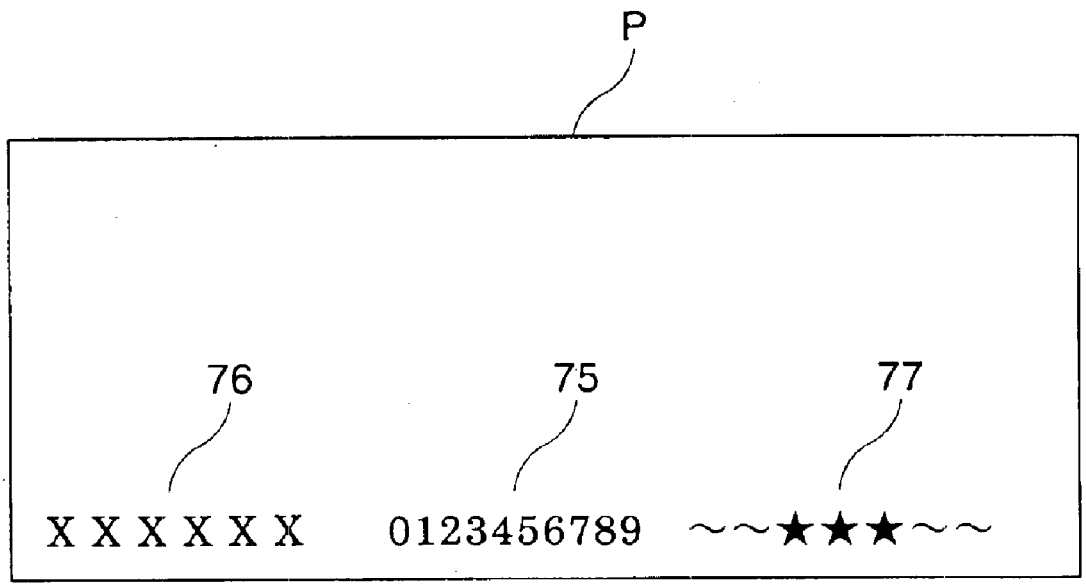
FIG. 10 is a plan view showing an example of a check having a company name and other characters or symbols printed in normal ink before and after the magnetic ink characters.

If a company name 76 and other characters or symbols 77 are printed in non-magnetic ink before and after the magnetic ink characters 75 as shown in FIG. 10, the OCR reader also attempts to read these non-magnetic ink characters 76, 77. The shapes of these non-magnetic ink characters 76, 77 are different from the shapes of the magnetic ink characters 75 and are therefore normally unreadable, but recognition errors can occur depending on the shape of the actual characters.

By identifying the location of the magnetic ink characters 75, however, this second embodiment of the invention can apply character recognition to only the magnetic ink characters 75. The possibility of misreads is therefore eliminated, unnecessary processing is eliminated, and high speed processing is therefore possible.

Third Embodiment

A third embodiment of the present invention is described next. This embodiment detects and corrects for certain irregularities that are likely to affect the magnetic reading process.

Magnetic ink mist can form unwanted dots when printing magnetic ink characters on a check. Dots from such mist can cause a false starting position to be detected for the magnetic ink characters, and this can lead to magnetic ink character read errors.

Magnetic ink character reading tests have also shown that when there is a fold through the magnetic ink character part of the check, the magnetic read signal waveform tends to be flat. This is probably because the fold lifts the magnetic ink characters away from the magnetic head. For the same reason folds can also result in false detection of the magnetic ink character starting position, leading to misreads or complete read failure.

This third embodiment of the invention optically detects such misted dots and folds, and corrects the magnetic reading process accordingly.

The configuration of this third embodiment is also similar to that of the first embodiment shown in FIG. 6, and differs therefrom in the addition of a fold detector 73, starting position verifier 74, and correction processor 57 as indicated by dotted lines in FIG. 6. A configuration having only the fold detector 73 or the starting position verifier 74 is also possible.

The fold detector 73 detects folds by comparing the actual magnetic waveform detected from the check with a histogram showing the number of black dots on the y-axis as a distribution in time on the x-axis. The starting position verifier 74 likewise compares the black dot distribution in the misted magnetic ink area with the dot distribution of the magnetic ink characters to differentiate meaningless mist dots from the magnetic ink characters.

If a fold is detected by the fold detector 73 or mist dots by starting position verifier 74, the correction processor 57 applies a specific correction process and instructs the main controller 55 to retry the magnetic ink reading process.

Figure 11:
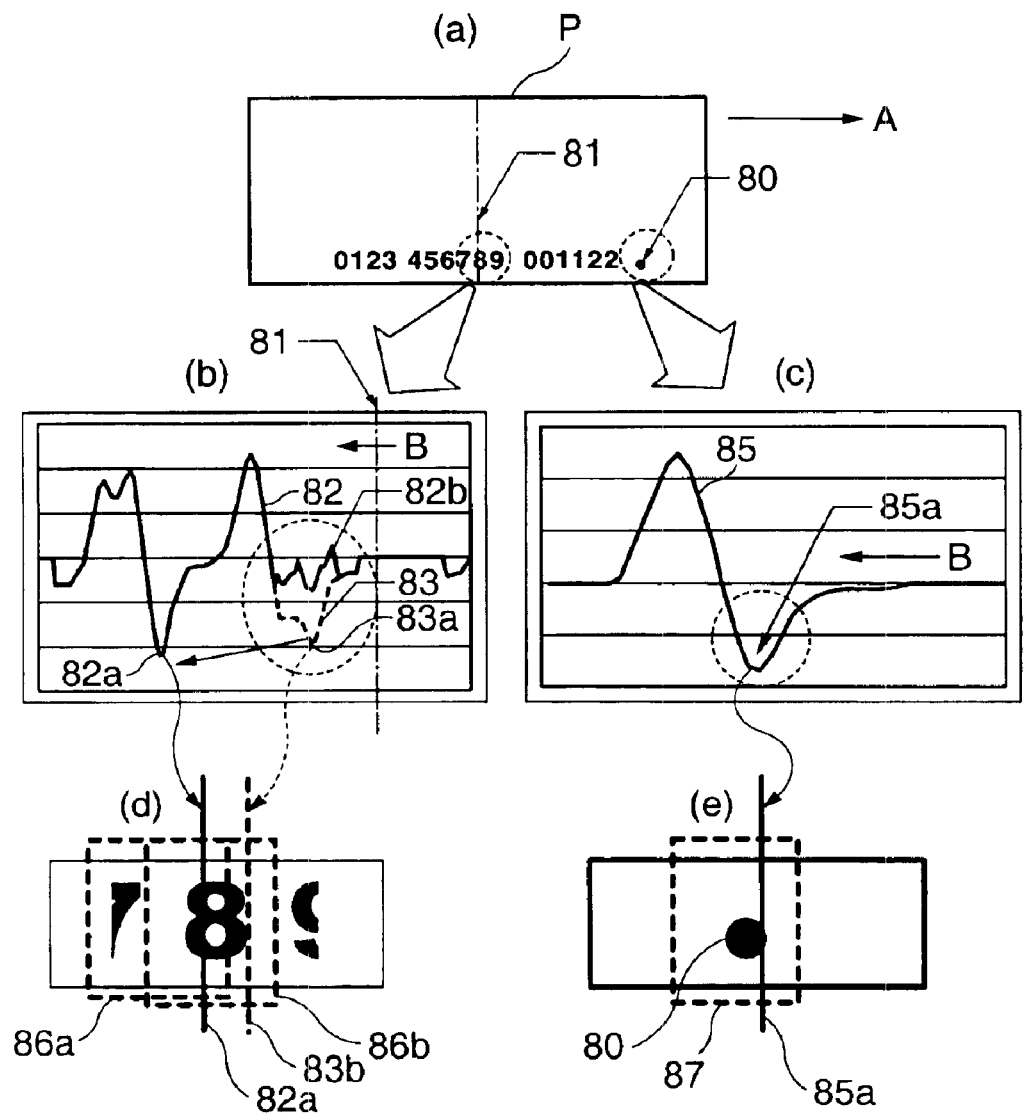
FIGS. 11(a)–(e) illustrate the processing of a check having a fold and a check having magnetic ink mist.

This is described more specifically with reference to FIG. 11. FIG. 11(a) is a plan view of a check having both magnetic ink mist 80 and a fold 81. FIG. 11(b) shows the magnetic waveform from the area of the fold, FIG. 11(c) shows the magnetic waveform from the ink mist, FIG. 11(d) is an enlarged view of the magnetic ink character at the fold, and FIG. 11(e) is an enlarged view of the ink mist dot.

The check P travels in the direction of arrow A in FIG. 11(a), thus resulting in magnetic waveform 85 being output for the magnetic ink mist 80 as shown in FIG. 11(c). The magnetic waveform 85 varies temporally in the direction of arrow B in FIG. 11(c). A waveform pattern such as shown in FIG. 11(c) does not exist in any of the magnetic ink characters, however, and is therefore recognized as an unreadable character. Optically, however, the black dot distribution of the ink mist 80 can be clearly recognized as not being a magnetic ink character, and this area is therefore ignored as not being a meaningful character. This eliminates the need for the operator to process this part of the check for unreadable characters.

A magnetic waveform 82 as shown in FIG. 11(b) is output in the area of the fold 81. The waveform 83 that should normally be output in the area of the fold 81 is indicated by a dotted line, and the waveform 82b that is actually output is indicated by the solid line, in FIG. 11(b). Because the waveform 83 normally output from the area of the fold 81 has a peak 83a, a character starting position would normally be calculated from this peak 83a if no fold 81 was present.

Because of the fold 81, however, the actual waveform 82b is relatively flat with little amplitude change and is therefore not detected as a peak. This means that the starting point of the character is calculated from the next detected negative peak 82a. This results in the area for extracting the character being set to extraction area 86a as shown in FIG. 11(d). When optically verified, however, the black dot distribution does not change as significantly as when there is a fold, and a more appropriate extraction area 86b can therefore be set. The character extraction area is therefore corrected to extraction area 86b based on optical processing, and the MICR reader then retries the recognition process.

Fourth Embodiment

A fourth embodiment of the present invention is described next with reference to FIG. 12, which is a block diagram describing read signal control and signal flow in this embodiment.

As shown in FIG. 4, a hybrid device 10 according to this embodiment of the invention conveys a check P according to a read command sent from the host 90 connected via external interface 52, reads optically scanned image data and magnetic ink character data output by MICR from the check P, sends this magnetic ink character data and image data to the host 90, and sends magnetic ink character position information to the host 90 in response to a character position information get command sent from the host 90.

Based on the received magnetic ink character data, image data, and magnetic ink character position information, the host 90 identifies the MICR line in the image data as needed, recognizes the magnetic ink characters from the image data by an OCR process, and then compares and verifies the magnetic ink character data acquired from the image data with the magnetic ink character data read by the MICR head 17 as necessary.

The hybrid device 10 may operate according to firmware stored in ROM 41, and the host 90 acquires magnetic ink character data, image data, and magnetic ink character position information from the hybrid device 10 and verifies the magnetic ink character data based on control driver software internal to the host 90 for the hybrid device 10.

Figure 12:
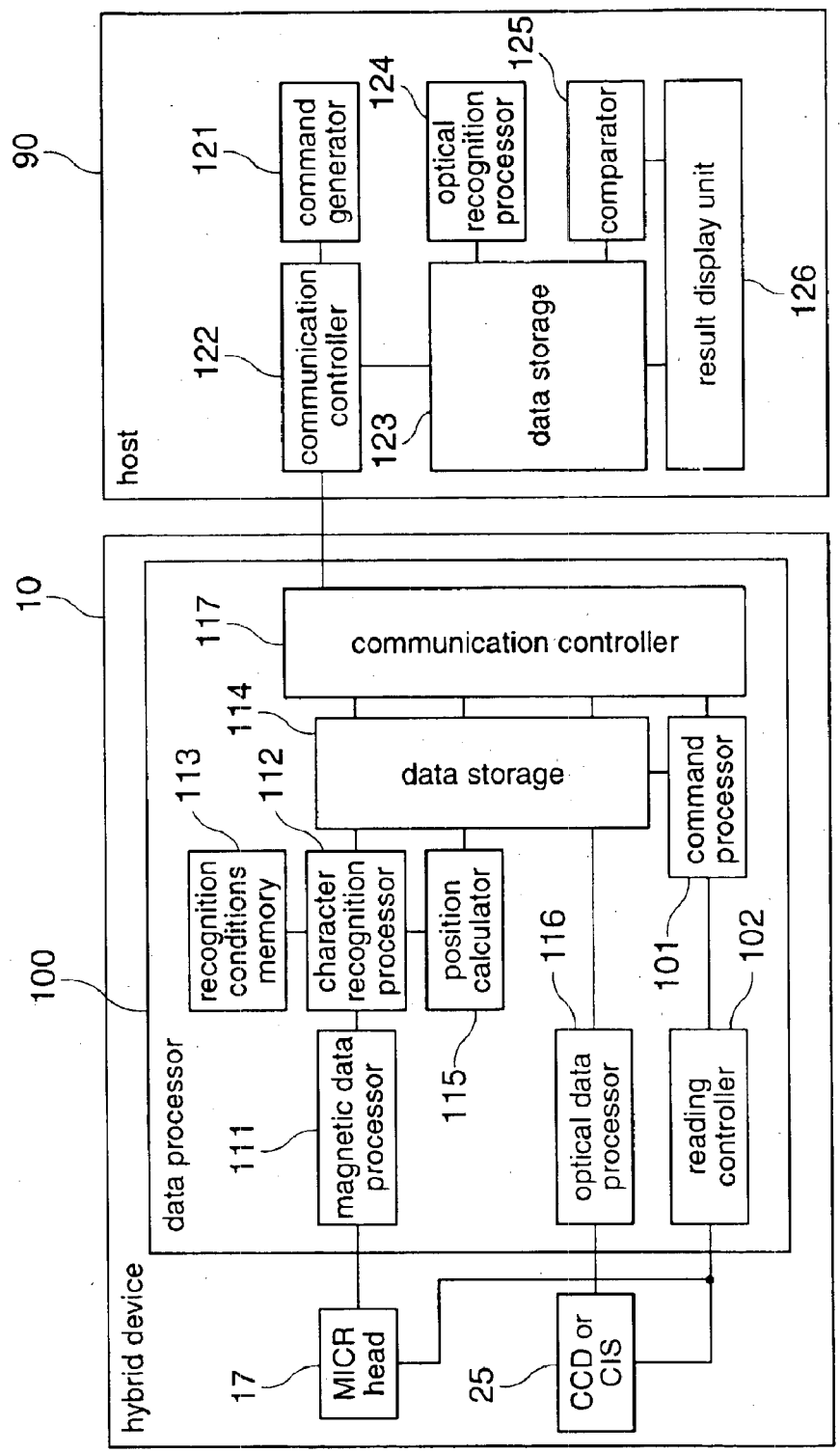
FIG. 12 is a block diagram illustrating the flow of a read signal control and signal flow according to an embodiment of the invention.

As shown in FIG. 12, the data processor 100 is configured as a signal processing control block in the hybrid device 10 by executing a program (e.g., firmware, software). This data processor 100 has a command processor 101, reading controller 102, magnetic data processor 111, character recognition processor 112, recognition conditions memory 113, data storage 114, position calculator 115, optical data processor 116, and communication controller 117.

The command processor 101 interprets commands received from the host 90 and then controls the reading controller 102 and data storage 114 according to the content of the interpreted commands.

The reading controller 102 controls magnetic ink character reading by the MICR head 17 and image data scanning by the CCD or CIS 25. More specifically, the reading controller 102 drives the MICR head 17 or CCD or CIS 25 while controlling the form transportation devices to capture magnetic data by means of the MICR head 17 or image data by means of the CCD or CIS 25.

The magnetic data processor 111 applies A/D conversion, magnetic ink character extraction, smoothing, and normalization processes to the magnetic data read by the MICR head 17, generating data that can be used for magnetic ink character recognition.

The character recognition processor 112 acquires the magnetic ink character data containing the numbers, characters, and other text information corresponding to the magnetic ink characters printed to the check P, and analyzes the magnetic data according to the character recognition conditions stored in recognition conditions memory 113. The magnetic ink character data acquired by the character recognition processor 112 is sent to the data storage 114 and position calculator 115.

The data storage 114 is a data storage area used as a data buffer in the data processor 100. More specifically, the data storage 114 temporarily stores the magnetic ink character data generated by the character recognition processor 112, as well as image data and magnetic ink character position information further described below.

The position calculator 115 calculates the printed position of magnetic-ink characters on the check P. More specifically, the position calculator 115 calculates the leading edge and trailing edge positions of a detected check based on whether a check is detected by the trailing edge detector 16 and leading edge detector 19 and the number of steps advanced by a stepping motor (not shown) for driving the form transportation rollers. Based on the leading edge and trailing edge positions, the check P feed distance, and the magnetic ink character detection position from the MICR head 17, the position calculator 115 then calculates the positions of the first and last magnetic ink characters counted from the leading edge or trailing edge of the check P, and the distance between magnetic ink characters, to generate the magnetic ink character position information.

The resulting magnetic ink character position information is temporarily stored in data storage 114 and if a get character position information command (in a format such as ESC A 112 . . . ) is received from the host 90, the command is interpreted in the hybrid device 10. Then, the hybrid device 10 sends to the host 90 the magnetic ink character position information, specifically the positions of the first and last magnetic ink characters counted from the leading edge or trailing edge of the check P and the distance between magnetic ink characters (specifically, (character count−1), distance values), generated by the position calculator 115 (steps 410–413 in FIG. 13).

The optical data processor 116 corrects the optical data read by the CCD or CIS 25, that is, the check P image data, and stores the corrected data in data storage 114.

The communication controller 117 functions as a sending and receiving means for exchanging commands and data with the host 90.

The control blocks of the host 90 are described next.

As also shown in FIG. 12, a command generator 121, communication controller 122, data storage 123, optical recognition processor 124, comparator 125, and result display unit 126 are configured in the host 90 by running a software driver program.

The command generator 121 generates commands sent to the hybrid device 10. More specifically, to acquire image data and magnetic ink character data from the hybrid device 10, the command generator 121 generates primarily a read command telling the hybrid device 10 to read the magnetic ink characters or scan and capture an image of the check, and a character position information get command telling the hybrid device 10 to send the magnetic ink character position information generated by the position calculator 115.

The communication controller 122 is a sending and receiving means for exchanging commands and data with the hybrid device 10. More specifically, the communication controller 122 sends the commands generated by the command generator 121 to the hybrid device 10, and receives and outputs to the data storage 123 data sent from the hybrid device 10.

The data storage 123 stores data received from the hybrid device 10, specifically the magnetic ink character data, image data as further described below, and magnetic ink character position information.

The optical recognition processor 124 identifies the magnetic ink character positions in the image data based on the magnetic ink character position information, and optically recognizes magnetic ink characters in the image data by applying an OCR process to the magnetic ink character positions identified in the image data. The magnetic ink character data recognized by the optical recognition processor 124 is then stored in data storage 123.

A comparator 125 compares the magnetic ink character data recognized by the character recognition processor 112 of the hybrid device 10 (the magnetic recognition characters) with the magnetic ink character data optically recognized by the optical recognition processor 124 (the optical recognition characters), to verify detection of the magnetic ink character data recognized by the character recognition processor 112. More specifically, if the comparator 125 determines that the compared optical recognition characters and magnetic recognition characters are the same, it is concluded that there are no misreads and operation continues. However, if the characters are not the same, at least one of the characters was mistakenly recognized, and the data is processed as unreadable. It should be noted that verification by the comparator 125 is not always needed, and can be applied only when the likelihood of misreads in the magnetically recognized magnetic ink character data exceeds a defined threshold level.

The result display unit 126 is a controller for displaying the process results of the comparator 125, and the process results can be presented for review on a monitor (not shown in the figure) by means of the result display unit 126.

Figure 13:
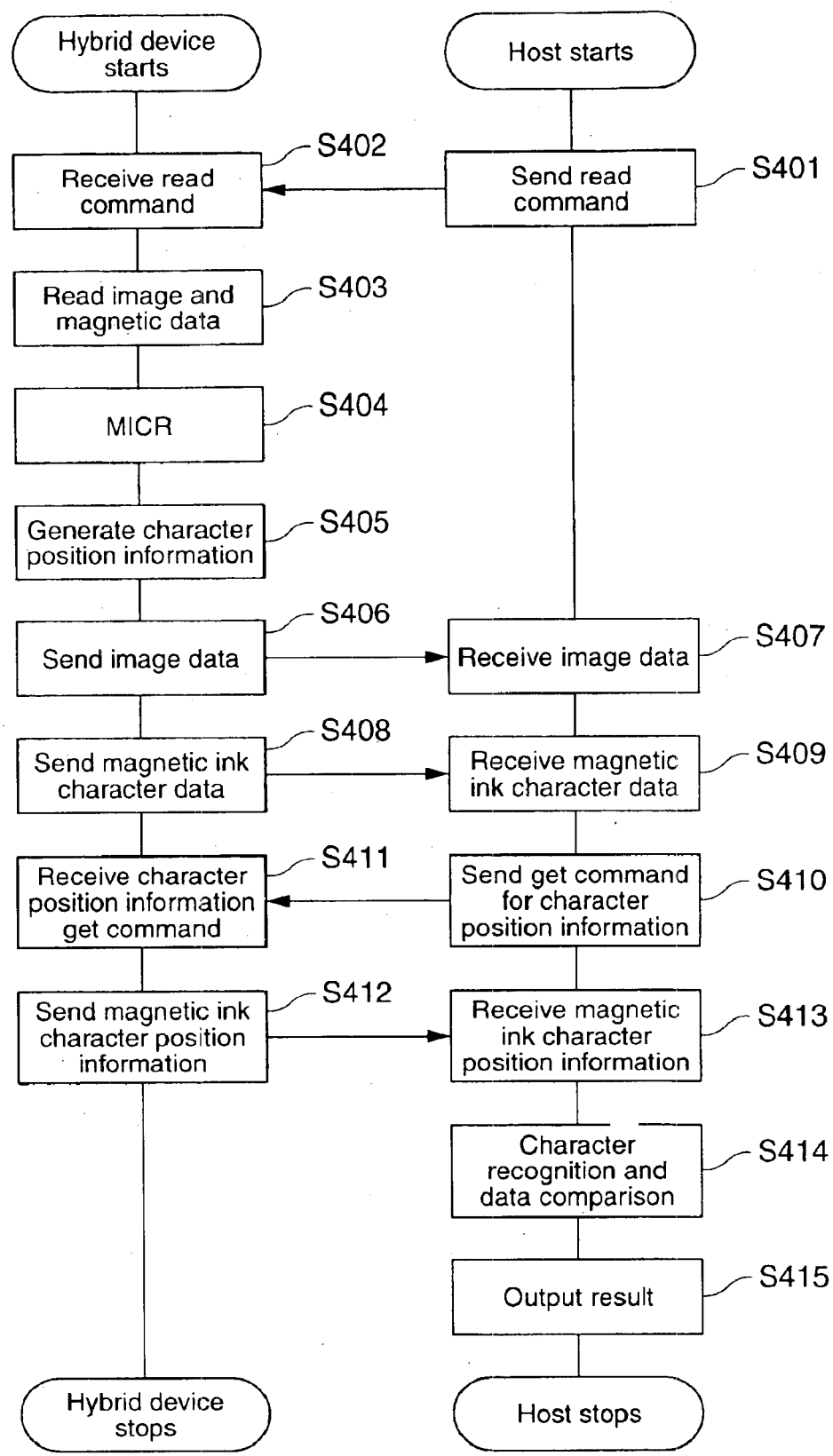
FIG. 13 is a flow chart illustrating a magnetic ink character reading method according to an embodiment of the invention.

The magnetic ink character reading method of the present embodiment is described next with reference to FIG. 13, a flow chart of this method.

The command generator 121 of the host 90 first generates a read command, which the host 90 then sends to the hybrid device 10 by way of communication controller 122 (step S401).

When the communication controller 117 of the hybrid device 10 receives this read command (step S402), the received read command is passed to the command processor 101. The command processor 101 then interprets the received read command and based on the result instructs the reading controller 102 to acquire image data and magnetic data from the check P. The reading controller 102 also controls check P transportation and driving the MICR head 17 and CCD or CIS 25 to acquire the image data and magnetic data from the check P (step S403).

After the magnetic data is acquired, the magnetic data processor 111 and character recognition processor 112 of the hybrid device 10 analyze the magnetic data for magnetic ink character recognition, and thus output the magnetic ink character data (step S404). The position calculator 115 also generates the magnetic ink character position information by analyzing the magnetic data (step S405). The resulting magnetic ink character data, magnetic ink character position information, and image data are stored temporarily to the data storage 114.

The hybrid device 10 then sends the image data from the data storage 114 to the host 90 (step S406), and sends the recognized magnetic ink character data to the host 90 (step S408).

The host 90 receives and stores the image data (step S407) and the magnetic ink character data (step S409) from the hybrid device 10 to data storage 123. The command generator 121 of the host 90 then generates a character position information get command, and the communication controller 122 sends the command to the hybrid device 10 (step S410).

The command processor 101 interprets the character position information get command when it is received by the hybrid device 10 (step S411). Based on the interpreted command, the command processor 101 sends instructions to the data storage 114 to retrieve the magnetic ink character position information. The magnetic ink character position information is then sent via communication controller 117 to the host 90 (step S412).

When the communication controller 122 of the host 90 receives the magnetic ink character position information (step S413), the host 90 stores the information to data storage 123. The optical recognition processor 124 then identifies the MICR line in the image data based on this magnetic ink character position information, and optically recognizes the magnetic ink characters from the image data by applying an OCR process to the MICR line identified in the image data.

The comparator 125 then compares the magnetic ink character data (magnetically recognized characters) recognized by the character recognition processor 112 of the hybrid device 10 and the magnetic ink character data (optically recognized characters) optically recognized by the optical recognition processor 124 to verify the magnetic ink character data recognized by the character recognition processor 112 (step S414).

Verification by the comparator 125 is not always necessary, and the invention can be configured to verify the magnetic ink character data only when the likelihood of misreads in the magnetically recognized character data exceeds a defined threshold level.

The result display unit 126 then presents the process results returned by the comparator 125 on a monitor not shown to report the results of magnetic ink character recognition to the user (step S415).

This completes the magnetic ink character reading process.

This embodiment of the invention thus off-loads OCR processing from the hybrid device 10, that is, the MICR device, to the host 90 for verification to improve the accuracy of magnetic ink character data detection.

This is advantageous in that the processor speed of the hybrid device 10 is typically magnitudes slower than the processor speed of the host 90. Executing an OCR process on the hybrid device 10 imposes a significant load on the hybrid device 10, slowing processing by the hybrid device 10 and thus reducing hybrid device 10 throughput.

By having the hybrid device 10 generate the magnetic ink character data and magnetic ink character position information and send such data and information, along with image data, to the host 90, which then applies an OCR process based on the magnetic ink character position information, greater efficiency is realized. Characters can be efficiently optically recognized without burdening the hybrid device 10, and verification can be applied as needed to improve the accuracy of magnetic ink character data detection.

Moreover, by having the hybrid device 10 execute the MICR process and the host computer 90 execute the OCR process, as described in this embodiment, changes to programs respectively controlling the MICR and OCR processes do not need to be made at the same time. Maintenance is therefore easier and a magnetic ink character data reading system that is easy to use and maintain can be provided.

The hybrid device 10 thus provides an efficient magnetic ink character reading system that meets this common need while also minimizing memory usage by the hybrid device 10.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A character reading system, comprising:
   a magnetic ink character reading device configured to read magnetic ink characters on a processed medium and to generate magnetic ink character data;
   an image reading device configured to scan an image of the processed medium and to generate image data;
   a position calculator configured to calculate positions of magnetic ink characters on the processed medium and to generate magnetic ink character position information; and
   a communication controller configured to send the magnetic ink character data, image data, and magnetic ink character position information to a host device;
   wherein the host device comprises an optical recognition device configured to optically recognize select magnetic ink characters from the image data based on the magnetic ink character position information.

2. A character reading system as described in claim 1, wherein the host device further comprises a comparison unit configured to compare the optically recognized magnetic ink characters with the magnetic ink character data generated by the magnetic reading device to verify the magnetic ink character data.

3. A character reading system as described in claim 1, wherein the host device is further configured to send to the magnetic ink character reading device a command directing the magnetic ink character reading device to send the magnetic ink character position information to the host device.

4. A character reading system as described in claim 1, further comprising:
   at least one of a fold detector configured to detect a fold in the processed medium and a stray mark detector configured to detect a stray mark on the processed medium; and
   a correction processor configured to apply a correction process if a fold or stray mark is detected and to instruct the magnetic ink character reading device to retry the magnetic ink character reading operation.

5. A character reading system, comprising:
   a transportation path adapted to convey a sheet-type processed medium having magnetic ink characters recorded thereon;

a magnetic reading device configured to acquire magnetic data corresponding to magnetic ink characters using a magnetic head disposed along the transportation path, and configured to read magnetic ink characters from the magnetic data;

a position calculator configured to generate position data identifying positions of magnetic ink characters on the processed medium based on the magnetic data from the magnetic reading device; and an optical character reading device configured to identify the positions of magnetic ink characters to be read based on the position data, and to optically read select magnetic ink characters.

6. A character reading method for reading magnetic ink characters printed on a processed medium using a magnetic ink character reading device and an optical reading device, the character reading method comprising the steps of:

(a) reading the magnetic ink characters using the magnetic reading device;

(b) calculating, using the magnetic ink character reading device, positions of the magnetic ink characters on the processed medium and generating position information; and (c) identifying magnetic ink character positions based on the position information and reading the magnetic ink characters using the optical reading device.

7. A character reading method for a character reading system comprised of a magnetic ink character reading device for reading magnetic ink characters on a processed medium, and a host device for controlling the magnetic ink character reading device, the character reading method comprising the steps of:

(a) reading magnetic ink characters on the processed medium and generating magnetic ink character data using the magnetic ink character reading device;

(b) scanning the processed medium and generating image data using the magnetic ink character reading device;

(c) calculating positions of magnetic ink characters on the processed medium and generating magnetic ink character position information using the magnetic ink character reading device;

(d) sending the magnetic ink character data, image data, and magnetic ink character position information to the host device; and (e) optically recognizing select magnetic ink characters from the image data based on the magnetic ink character position information.

8. A character reading method as described in claim 7, further comprising a step of the host device comparing the optically recognized magnetic ink characters and the magnetic ink character data generated by the magnetic reading device to verify the magnetic ink character data.

9. A character reading method as described in claim 7, further comprising the steps of:

(f) detecting any folds or stray marks in the processed medium; and (g) applying a correction process, if a fold or stray mark is detected, and repeating step (a).

10. A character reading method as described in claim 7, further comprising the step of the host device sending to the magnetic ink character reading device a command directing the magnetic ink character reading device to send the magnetic ink character position information to the host device.

11. A character reading method for a character reading system comprised of a magnetic ink character reading device for reading magnetic ink characters on a processed medium, and a host device for controlling the magnetic ink character reading device, the character reading method comprising steps of:

performing the following steps using the magnetic ink character reading device reading each of the magnetic ink characters at one of a plurality of recognition condition levels or, if any character cannot be read at any of the recognition condition levels, declaring that character as unreadable;

scanning the processed medium and generating image data;

calculating the position of each of the magnetic ink characters on the processed medium relative to a known position on the processed medium and generating corresponding magnetic ink character position information; and sending the magnetic ink character data, image data, and magnetic ink character position information to the host device; and performing the following step using the host device optically recognizing, from the image data and the magnetic ink character position information, each magnetic ink character for which it was determined that verification is required.

12. A character reading method as described in claim 11, further comprising a step of the host device comparing each optically recognized magnetic ink character with the corresponding magnetically read character to verify the magnetic ink character data.

* * * * *